US010523691B2

(12) United States Patent
Vejman et al.

(10) Patent No.: US 10,523,691 B2
(45) Date of Patent: Dec. 31, 2019

(54) GRAPH PRIORITIZATION FOR IMPROVING PRECISION OF THREAT PROPAGATION ALGORITHMS

(71) Applicant: Cisco Technology, Inc., San Jose, CA (US)

(72) Inventors: Martin Vejman, Litomysl (CZ); Lukas Machlica, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 15/400,389

(22) Filed: Jan. 6, 2017

(65) Prior Publication Data

US 2018/0198805 A1 Jul. 12, 2018

(51) Int. Cl.
| | | |
|---|---|---|
| *G06N 20/00* | (2019.01) | |
| *H04L 29/06* | (2006.01) | |
| *G06N 7/00* | (2006.01) | |
| *G06N 5/02* | (2006.01) | |
| *H04L 29/12* | (2006.01) | |

(52) U.S. Cl.
CPC ......... *H04L 63/1416* (2013.01); *G06N 5/022* (2013.01); *G06N 7/005* (2013.01); *G06N 20/00* (2019.01); *H04L 63/14* (2013.01); *H04L 63/1441* (2013.01); *H04L 61/1511* (2013.01); *H04L 63/1425* (2013.01); *H04L 2463/146* (2013.01)

(58) Field of Classification Search
CPC . H04L 63/14; H04L 63/1416; H04L 63/1425; H04L 63/1441; G06N 20/00
See application file for complete search history.

(56) References Cited

U.S. PATENT DOCUMENTS

| | | | |
|---|---|---|---|
| 8,448,245 B2 | 5/2013 | Banerjee et al. | |
| 9,635,049 B1* | 4/2017 | Oprea | H04L 63/145 |
| 10,129,276 B1* | 11/2018 | Raviv | H04L 63/1425 |
| 10,193,915 B2* | 1/2019 | Coskun | H04L 63/1425 |
| 2015/0278729 A1 | 10/2015 | Hu et al. | |

(Continued)

OTHER PUBLICATIONS

Gross, Jonathan and Yellen, Jay, Handbook of Graph Theory, CRC Press, 2004, p. 2-3, 25-26.*

(Continued)

*Primary Examiner* — Daniel B Potratz
*Assistant Examiner* — D'Arcy Winston Straub
(74) *Attorney, Agent, or Firm* — Patterson + Sheridan, LLP

(57) ABSTRACT

Systems described herein preemptively detect newly registered network domains that are likely to be malicious before network behavior of the domains is actually observed. A network security device (e.g., a router) receives domain registration data that associates network domains with keys and generating a graph representing the domain registration data. Each edge of the graph connects a vertex representing a domain and a vertex representing a registration attribute (e.g., a registrant email address). The network security device identifies a connected component of the graph that meets a graph robustness threshold. The network security device determines whether a domain of the connected component whose behavior has not yet been observed is malicious using a predictive model based on existing maliciousness labels for other domains of the connected component.

20 Claims, 8 Drawing Sheets

(56) References Cited

U.S. PATENT DOCUMENTS

| | | | | |
|---|---|---|---|---|
| 2015/0286928 A1* | 10/2015 | Demiralp | ................. | G06N 5/02 |
| | | | | 706/61 |
| 2016/0065597 A1* | 3/2016 | Nguyen | .............. | H04L 63/1441 |
| | | | | 726/22 |
| 2016/0226819 A1* | 8/2016 | Manadhata | ......... | H04L 61/1511 |
| 2017/0026390 A1* | 1/2017 | Sofka | .................. | H04L 63/1416 |

OTHER PUBLICATIONS

Gross, J. & Yelle, J., Handbook of Graph Theory, CRC Press, p. 2-3, 25-26 (Year: 2003).*

Issa Khalil; Ting Yu; Bei Guan. "Discovering Malicious Domains through Passive DNS Data Graph Analysis."Conference Paper; AsiaCCS Conference, Jun. 2016. pp. No. 01-12; https://www.researchgate.net/publication/296678352_Discovering_Malicious_Domains_through_Passive_DNS_Data_Graph_Analysis.

Deebiga Rajeswaran; "Function Call Graph Score for Malware Detection." San Jose State University, SJSU Scholar Works; Master's Projects-Master's Theses and Graduate Research; Fall 2015; pp. 1-60. http://scholarworks.sjsu.edu/cgi/viewcontent.cgi?article=1438&context=etd_projects.

Luca Invernizzi; Stanislav Miskovic; Ruben Torres; Sabyasachi Saha; Sung-Ju Lee; Marco Mellia; Christopher Kruegel; Giovanni Vigna. "Nazca: Detecting Malware Distribution in Large-Scale Networks." NDSS '14, Feb. 23-26, 2014 San Diego, CA, USA pp. No. 01-16 http://www.internetsociety.org/sites/default/files/11_1_1.pdf.

* cited by examiner

GRAPH PRIORITIZATION FOR IMPROVING PRECISION OF THREAT PROPAGATION ALGORITHMS

TECHNICAL FIELD

The present disclosure relates to network security and, in particular, detecting malicious entities.

BACKGROUND

In general, anti-malware systems detect malicious software by analyzing how software behaves. Anti-malware systems can also blacklist websites and domains that transmit such software to prevent users from being victimized. In order to circumvent such blacklisting, purveyors of malware may frequently transfer malicious content to new web domains that have not yet been blacklisted or otherwise tagged as malicious. Once data about the behavior of these new domains is gathered, however, anti-malware systems can analyze the behavior and tag the new domains as malicious.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
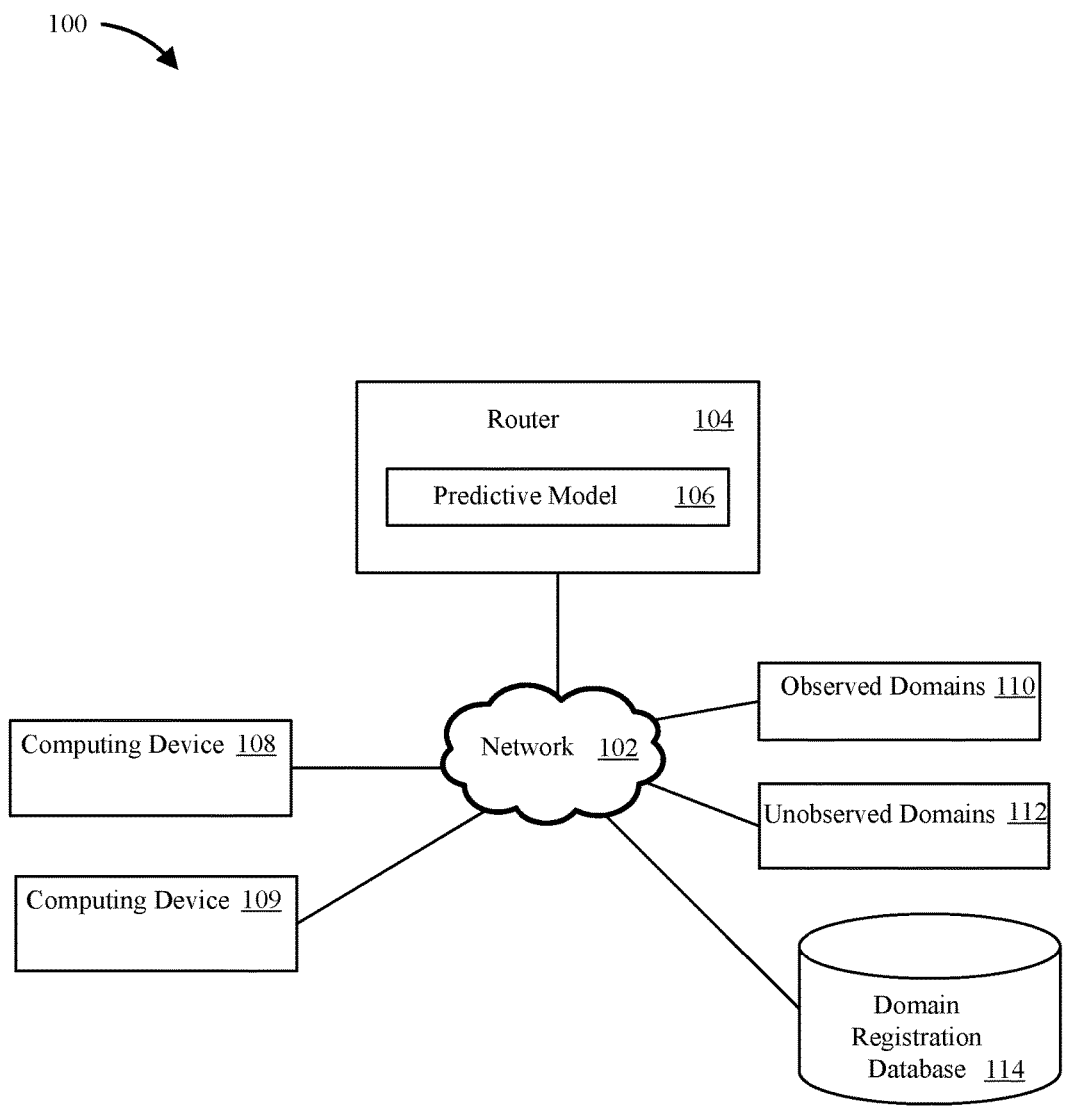
FIG. 1 illustrates a computing environment that may be used to apply techniques of the present disclosure for discovering unknown malicious domains, according to one embodiment.

Embodiments presented described herein detect newly registered network domains that are likely to be malicious before network behavior of the domains is actually observed. Such domains may be detected by receiving domain registration data that associates network domains with keys, generating a graph representing the domain registration data such that each edge of the graph connects a vertex representing a domain and a vertex representing a key, identifying a connected component of the graph that meets a graph robustness threshold, identifying maliciousness labels for observed domains represented by vertices of the connected component, and determining a maliciousness value (i.e., a predicted maliciousness label) for an unobserved domain represented by a target vertex in the connected component using a predictive model that propagates the maliciousness labels for the observed domains. The system then applies a network policy to network traffic associated with the unobserved domain based on the maliciousness value.

Example Embodiments

Embodiments presented herein provide techniques for identifying malicious network domains based on domain registration (or other similar) information. Since the detection is based on domain registration information rather than on actual observed behavior of the domain, embodiments of the present disclosure can apply network policies to traffic from the domain before any users are victimized.

Suppose a new domain called "example.com" is registered in a domain registration database. Also suppose that registration attributes provided with the registration (referred to herein as "keys") for the domain include a registrant email address of "odysseus@horse.net," a registrant name of "Laertes of Ithaca," a registrant organization of "Circe Incorporated," and a registrant street address of "123 Penelope."

Software executing on a router (or another device used for network security) identifies other domains registered in the database that have at least one key in common with the domain "example.com." The software generates a graph that includes a vertex for the domain "example.com" (the target vertex for which a maliciousness label is to be determined) and a vertex for each domain that has at least one key in common with "example.com," respectively. These vertices may be referred to as "domain vertices" of the graph because they represent domains.

In addition, the software generates a vertex for each key associated with the domains. These vertices may be referred to as "key vertices" of the graph because they represent keys. The software also generates edges to represent the relationships between the domains and the keys. Specifically, each edge connects a domain vertex and a key vertex, thereby signifying that the key represented by the key vertex is an attribute of the domain represented by the domain vertex.

The resulting graph reflects relationships between keys and domains, including the domain "example.com." If at least some of the domains represented in the graph are known to be malicious or known to be legitimate, this knowledge can be used to infer whether "example.com" is malicious or not based on the relationships represented the graph. For example, if many domains in the graph are known to be malicious, "example.com" may also be malicious. However, some of the relationships portrayed in the graph may not be very meaningful for inferring maliciousness. This is because some common keys may be shared by multiple unrelated domains. For example, if the keys depicted in the graph included the registrant country "Greece," the graph would include vertices for any domain associated with an address in Greece—and the most of those domains are unlikely to be meaningfully related to "example.com."

Therefore, in order to ensure that meaningful relationships are used to infer whether "example.com" is malicious, the software identifies a connected component that includes the target vertex and meets a graph robustness threshold. In this example, suppose the graph robustness threshold is an edge connectivity of 4 (i.e., at least four edges would have to be deleted from the component to disconnect the component).

The software uses the connected component instead of the entire graph to infer whether "example.com" is malicious. In order to make the inference, the software first identifies maliciousness labels for domains represented by domain vertices of the connected component. In this example, the software compares the domains to a blacklist and a whitelist. The software labels blacklisted domains as malicious and labels whitelisted domains as benign. Once these labels are defined, the software applies a predictive model to infer a maliciousness value (i.e., a predicted maliciousness label) for the domain "example.com." For example, the software could use a Variational Bayes model to determine a probability that "example.com" is malicious based on the topology of the connected component and the known maliciousness labels. The software compares the probability to a threshold probability and assigns a maliciousness value to "example.com" based on the comparison. Once the maliciousness value has been assigned, the software applies a network policy to network traffic associated with "example.com" based on the maliciousness value. For example, if "example.com" is deemed malicious, the router can block traffic from "example.com" accordingly. The software can also add "example.com" to a blacklist.

FIG. 1 illustrates a computing environment 100 with a router 104 configured to discover unknown malicious domains, according to one embodiment. As shown, the environment 100 includes a router 104 (though another device configured to apply network policies to network traffic, such as a firewall, a proxy, or a switch may also be used). Router 104 uses predictive model 106 to identify malicious network domains before observing traffic from such malicious domains. Predictive model 106 may be built or generated based on the behavior of observed domains 110. While FIG. 1 shows predictive model 106 to be located at router 104, predictive model 106 may be generated and executed on another device and the router 104 can implement network policies in response to predictions made by predictive model 106.

Observed domains 110 may be considered "observed" because they have sent traffic through network 102 (e.g., to computing devices 108, 109) and the malicious or benign nature of the observed domains 110 can be determined based on that traffic. For example, the contents of network packets sent from observed domains 110 may be examined or the results of the traffic being received by computing devices 108, 109 may be observed. According to other examples, router 104 can also receive data from other network environments or other devices that indicating whether or not observed domains are benign or malicious domains.

Once the malicious or benign behavior of observed domains 110 is known, the router 104 generates predictive model 106. Predictive model 106 correlates the malicious or benign behavior of observed domains 110 with registration data (e.g., features or keys) associated with the domains. For example, the registration data associated with a particular domain may include email addresses, postal addresses, Internet Protocol (IP) addresses, organization names, and individuals. This registration data for the observed domains 110 may be retrieved from domain registration database 114. Domain registration database 114 may be a publicly or commercially available database that associates domains with registration data, such as the WHOIS database. As would be understood by those skilled in the art, the WHOIS database stores the registered users or assignees of an Internet resource (e.g., a domain name, an IP address block, or an autonomous system), but also provides other information. Accordingly, the WHOIS database may be used to determine malicious network domains through the techniques described herein.

By examining the registration data and the known malicious or benign behavior of observed domains 110, predictive model 106 may be generated and used to correlate keys found in the registration data with benign or malicious behavior. Once this correlation between specific keys and malicious or benign behavior is known, the malicious or benign behavior of unobserved domains 112 can be predicted from keys that are associated with both unobserved domains 112 and observed domains 110. For example, if predictive model 106 indicates a strong correlation between a particular email address and malicious behavior by observed domains 110, unobserved domains 112 that are also associated with the particular email address can be predicted to be malicious before any traffic from unobserved domains 112 is encountered or examined.

Data for unobserved domains 112, including keys that are common to observed domains 110, is retrieved from domain registration database 114. Because predictive model 106 correlates keys to malicious behavior, the keys for unobserved domains 112 may be used by predictive model 106 to predict the benign or malicious nature of unobserved domains 112. Accordingly, when traffic (e.g., network packets) is sent from unobserved domains 112 to computing devices 108, 109, router 104 can apply network policies to the traffic in response to the predictions made by predictive model 106. For example, if predictive model 106 predicts that unobserved domains 112 are malicious, router 104 may proxy or block the traffic sent from unobserved domains 112.

In one example, the predictive model 106 may be defined as follows:

$$p(d|m_s,s) \sim Bi(m_s)$$

and $$p(m_s|s) \sim Beta(a_{K_s}, b_{K_s}),$$

where $p(d|m_s,s)$ is the probability that a malicious activity is detected (d) given the maliciousness $m_s$ of the domain s, which follows the binomial distribution Bi. The expression $p(m_s|s)$ is the prior probability of the maliciousness $m_s$, which follows the Beta distribution with parameters $a_{K_s}, b_{K_s}$. The parameters $a_{K_s}, b_{K_s}$ are functions of the keys of domain s. The idea is that each key k has its own values $a_k$ and $b_k$ that determine the probability distribution of maliciousness of the key k, defined as $$p(m_k|k) \sim Beta(a_k, b_k).$$

In order to obtain the probability distribution $p(m_s|s)$, the hyper parameters $a_{K_s}, b_{K_s}$ are calculated as a product of the partial parameters $a_k, b_k$ for all $k \in K_s$ as $$a_{K_s} = \prod_{k \in K_s} a_k$$

$$b_{K_s} = \prod_{k \in K_s} b_k$$

In other words the value of $m_s$ quantifies a confidence about maliciousness of the domain s. The Binomial and Beta distributions provided above are special cases of Multinomial and Dirichlet distributions, respectively. However, the approach as described herein is not limited to those special cases.

To complete the model another prior is introduced to the values $a_k$ and $b_k$ for all keys k. This allows a strength of the Beta priors to be set, a priori. The priors are:

$$p(a_k) \sim Gamma(u_a, v_a)$$

and $$p(b_k) \sim Gamma(u_b, v_b),$$

which both follow Gamma distribution rules and are set to be the same for all keys k. Therefore, the values u and v are the parameters of the model that are tuned. The Gamma prior was selected because, under certain approximations, it is a conjugate prior to the Beta distribution.

Generally, posterior probabilistic distributions have well-defined parametric forms. Both of the priors are selected such that they are conjugate to the posteriors. The conjugates are used in the Variational Bayes approach to learn the parameters.

After the inference is done, the model can be queried to give a probability of maliciousness of both previously seen and unseen domains as long as the domains share at least some keys in common with some of the observed domains used to generate the probabilistic model. A strength of this approach is that it is purely probabilistic, and the variables have well defined, understandable meanings.

The techniques described herein also provide a measure of confidence of the inferred assessment. In other words, the techniques described herein focus on estimating the probability $m_s$ that a domain s is malicious, and also on a confidence level of that determination. In order to infer maliciousness and an associated confidence level, a prior distribution of maliciousness, $m_s$ needs to be created. This prior distribution is a Beta distribution, which may be a standard conjugate prior for the binomial distribution of maliciousness, $m_s$. This standard conjugate prior allows for the learning of the parameters of the observed entities that lead to a maliciousness, $m_s$.

The model can be directly used as a classifier of entities into malicious or benign classes by thresholding the inferred probability. Specifically, a numerical value is determined to serve as a threshold for determining whether or not a domain is malicious. If the probability p for a domain exceeds the threshold, the domain is determined to be malicious.

Figure 2:
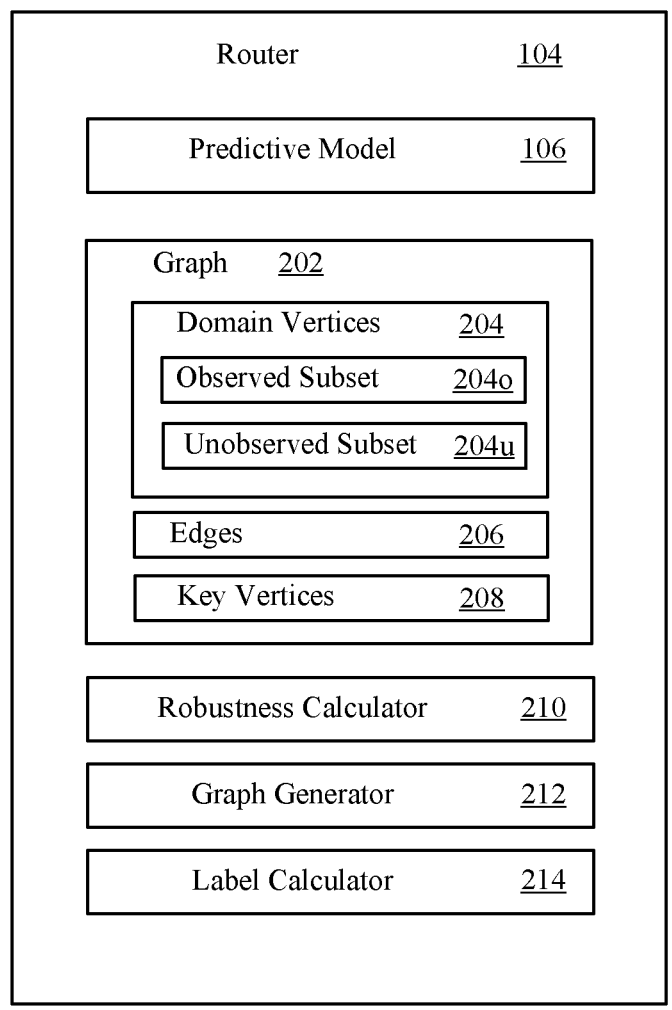
FIG. 2 illustrates a detailed view of an example router that can discover unknown malicious domains, according to one embodiment.

FIG. 2 illustrates a detailed view 200 of the router 104, according to one embodiment. Router 104 includes predictive model 106. The router 104 receives domain registration data from a data store (e.g., domain registration database 114). The domain registration data associates network domains with keys (e.g., registrant email addresses, street addresses, registrant names, or registrant organizations).

Graph generator 212 creates graph 202 based on the domain registration data. Specifically, graph generator 212 creates domain vertices 204 to represent domains specified in the domain registration data and key vertices 208 to represent keys specified in the domain registration data. Domain vertices 204 can be described as the union of two disjoint subsets of vertices: the observed subset 204o and the unobserved subset 204u. Vertices in the observed subset 204o represent observed domains. Vertices in the unobserved subset 204u represent unobserved domains.

Graph generator 212 also creates edges 206. Each of the edges 206 connects one of the domain vertices 204 and one of the key vertices 208. An edge between a domain vertex and a key vertex signifies that the key is included in a set of keys associated with the domain. Since multiple domains may be associated with a single key, a given vertex in the key vertices 208 may be connected to several of the domain vertices 204 via several of the edges 206.

Once graph 202 has been created, robustness calculator 210 identifies connected components of the graph 202 that meet a graph robustness threshold. In one embodiment, the graph robustness threshold is a measure of edge connectivity. The "edge connectivity" of a connected component refers to the minimum number of edges that would have to be deleted from the component in order to disconnect at least one vertex from the component.

Once the connected components meeting the robustness threshold have been identified, the label calculator 214 determines maliciousness labels for vertices in the observed subset 204o. The label calculator 214 may determine these maliciousness labels based on the actual network traffic or behavior of the observed domains. Alternatively, the label calculator 214 may retrieve maliciousness labels for vertices in the observed subset 204o from a blacklist that is stored remotely or locally.

Once the maliciousness labels for vertices in the observed subset 204o have been determined, the label calculator 214 uses the predictive model 106 to determine maliciousness values for the vertices in the unobserved subset 204u. In this context, the term "maliciousness value" refers to a predicted maliciousness label for an unobserved domain.

To determine the maliciousness value for a given unobserved domain represented by a target vertex in the unobserved subset 204u of the domain vertices 204, the label calculator 214 proceeds as follows. First, the label calculator identifies the connected component that includes the target vertex and meets the graph robustness threshold. Next, the label calculator 214 applies the predictive model 106 to the connected component to determine the maliciousness value for the target vertex. Based on the structure of the connected component and the maliciousness labels for vertices of the connected component that represent observed domains, the predictive model 106 determines the maliciousness value for the unobserved domain represented by the target vertex. The predictive model 214 may be a Variational Bayes model. Alternatively, the predictive model 214 may be some other type of statistical or machine-learning model designed for label propagation, such as an adsorption model.

Figure 3:
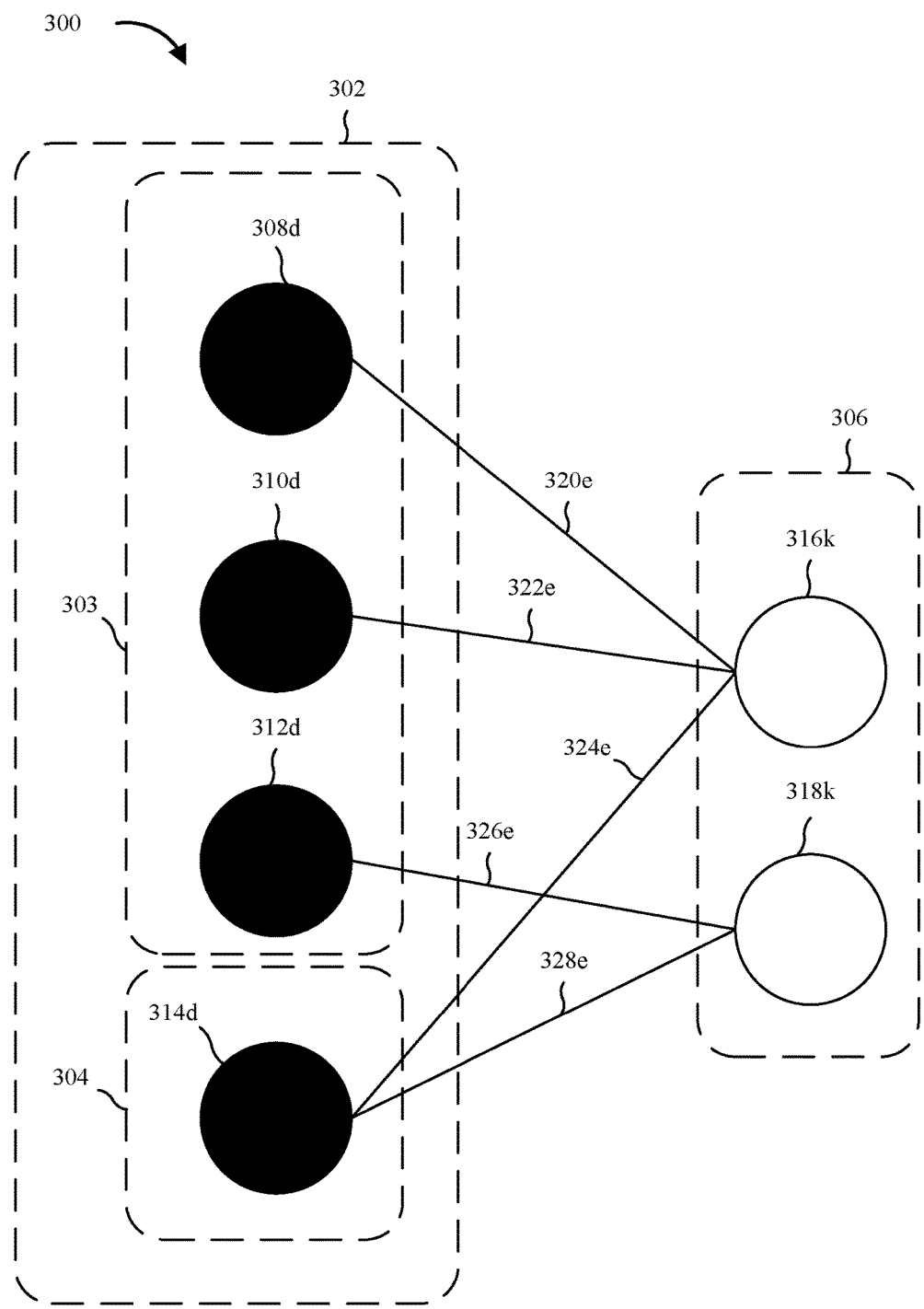
FIG. 3 illustrates a bipartite graph for use with a predictive model to determine that an unobserved domain is malicious, according to one example.

FIG. 3 illustrates a bipartite graph 300 for use with a predictive model to determine that an unobserved domain is malicious, according to one example. Bipartite graph 300 can be defined as follows:

$$G = (S, K, E),$$

where G represents the bipartite graph 300. S is a set 302 of vertices 308d, 310d, 312d, and 314d. Each of the vertices 308d, 310d, 312d, and 314d represents a corresponding domain. K is a set 306 of vertices 316k and 318k. Each of the vertices 316k, 318k represents a key that is a datum of domain registration information, such as a registrant email or a registrant name. E is a set of edges 320e, 322e, 324e, 326e, and 328e. There is an edge between a vertex in S and a vertex in K if the vertex in S corresponds to a domain associated with the key represented by the vertex in K.

The set 302 of the vertices S has been split into two disjoint groups: the "Observed" group 303 and the "Unknown" group 304. Group 303 includes vertices representing domains for which network traffic or other behavior has been observed. In this example, group 303 includes vertices 308d, 310d, and 312d. In this example, assume that vertex 308d has been labeled as benign, while vertices 310d and 312d have been labeled as malicious based on observed behavior. Group 304 includes vertices representing domains for which network traffic or other behavior has not yet been observed. In this example, group 304 includes vertex 314d. Because the domain represented by vertex 314d has not been observed, vertex 314d cannot be directly labeled based on behavior. Instead, a maliciousness value for vertex 314d may be determined through an inference based on the keys K. For example, the domain represented by vertex 314d is more likely to be malicious than benign because it is related to two other malicious domains (represented by vertices 310d and 312d), but only one benign domain (represented by vertex 308d). Specifically, the unobserved domain (represented by vertex 314d) shares keys (represented by vertices 316k and 318k) with two malicious domains (represented by vertices 310d and 312d), but only one key (represented by vertex 316k) with the benign domain (represented by vertex 308d). Accordingly, when traffic is eventually received from the unobserved domain represented by vertex 314d, the traffic may be treated as traffic from a malicious domain.

Figure 4A:
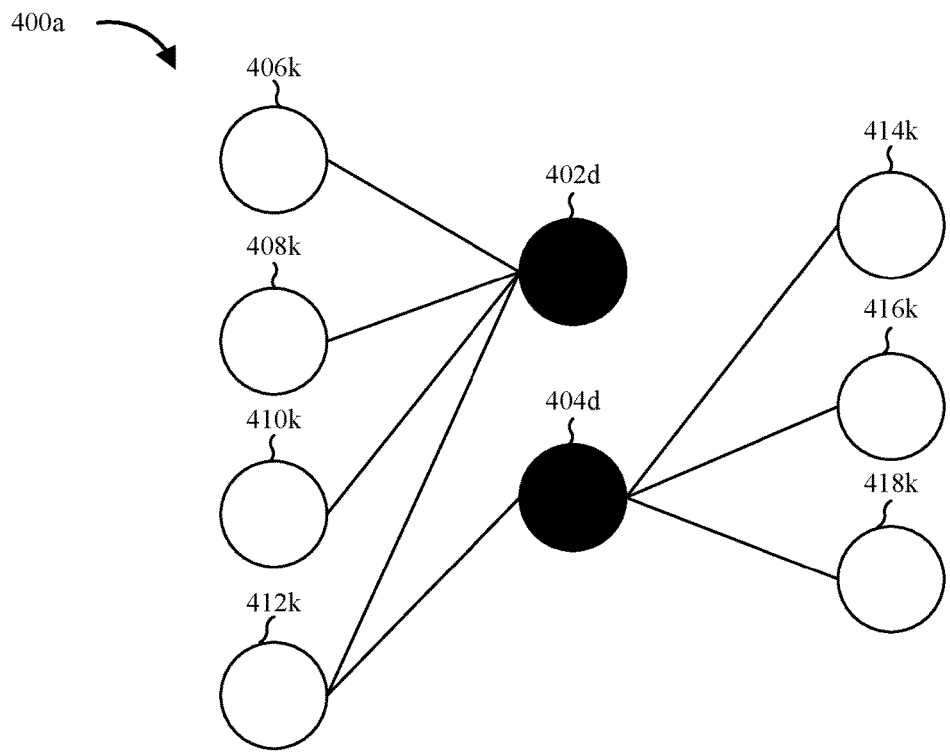
FIG. 4A illustrates a graph representing an example relationship between domains and keys, according to one embodiment.

FIG. 4A illustrates a graph 400a that represents an example relationship between domains and keys, according to one embodiment. Vertex 402d and vertex 404d represent network domains. Vertices 406k-418k represent keys associated with the network domains in a domain registration database, such as registrant email addresses, street addresses, registrant names, or registrant organizations. As shown, both vertex 402d and vertex 404d have edges connecting to vertex 412k. The edge connectivity of the graph 400a is one (1), since deleting either the edge between 404d and 412k or the edge between 402d and 412k would disconnect the graph 400a. In practical terms, this signifies that the two network domains (represented by vertices 402d and 404d) have a single key (represented by vertex 412k) in common. If that key is generic, the network domains may not be meaningfully related. In other words, the maliciousness of one of the two domains may not provide information that is useful for predicting whether the other domain is malicious. As a result, a label calculator would only use graph 400a to predict a maliciousness value if the graph robustness threshold was set relatively low (e.g., to an edge connectivity of 1).

Figure 4B:
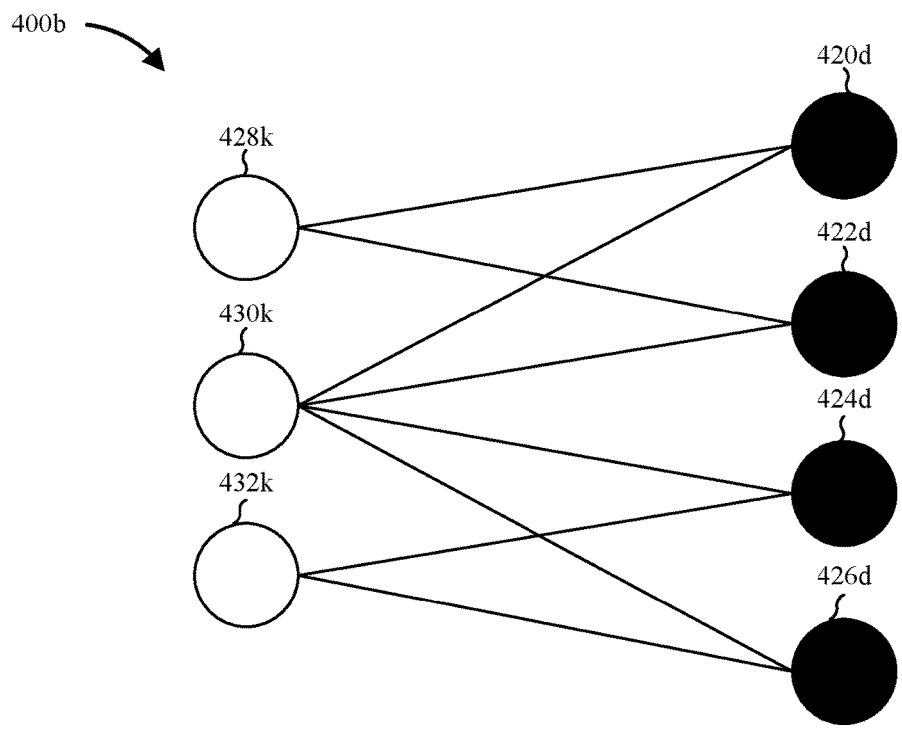
FIG. 4B illustrates a graph representing a second example relationship between domains and keys, according to one embodiment.

FIG. 4B illustrates a graph 400b that represents a second example relationship between domains and keys, according to one embodiment. Vertices 420d-426d represent network domains. Vertices 428k-432k represent keys associated with the network domains in a domain registration database, such as registrant email addresses, street addresses, registrant names, or registrant organizations. As shown, each of the vertices 420d-426d has edges to at least two of the vertices 428k-432k. The edge connectivity of the graph 400b is two (2), since at least two edges would have to be deleted to disconnect the graph 400b. In practical terms, this signifies that each of the keys (represented by vertices 428k-432k) is associated with at least two of the domains (represented by vertices 420d-426d) and that each domain is associated with at least two of the keys. The strength of the relationship between the domains is, therefore, stronger than the relationship illustrated in FIG. 4A. As a result, a label calculator would use graph 400b to predict a maliciousness value if the graph robustness threshold was set to an edge connectivity of 2 or less.

Figure 4C:
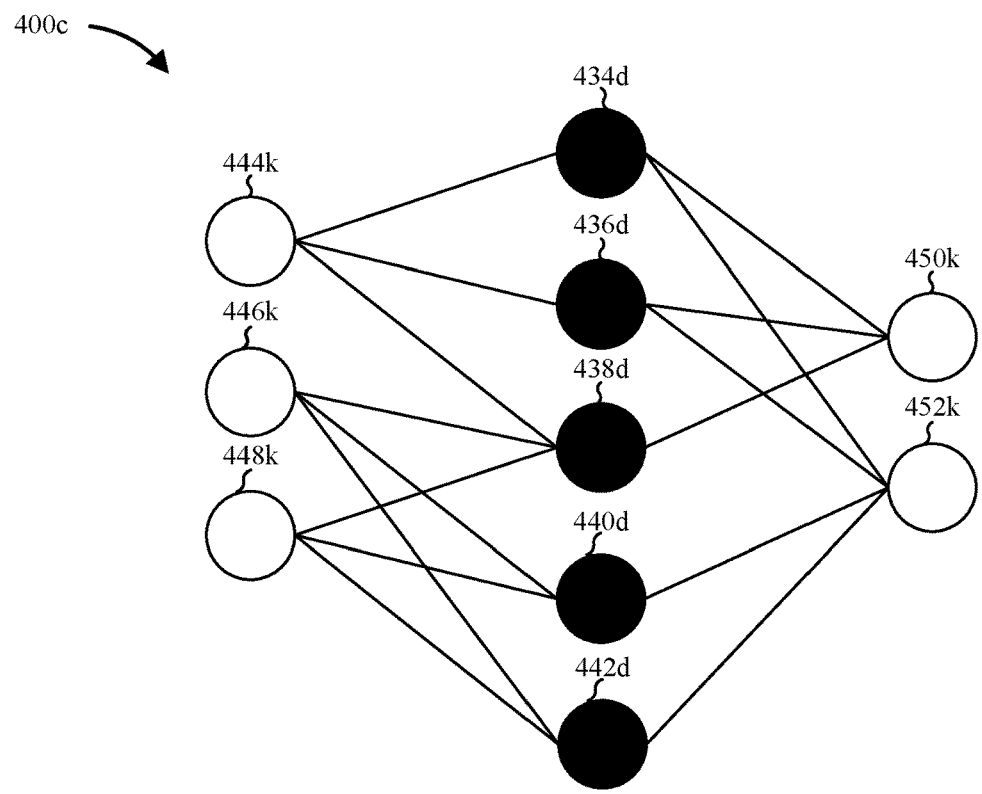
FIG. 4C illustrates a graph representing a third example relationship between domains and keys, according to one embodiment.

FIG. 4C illustrates a graph 400c that represents a third example relationship between domains and keys, according to one embodiment. Vertices 434d-442d represent network domains. Vertices 444k-452k represent keys associated with the network domains in a domain registration database, such as registrant email addresses, street addresses, registrant names, or registrant organizations. As shown, each of the vertices 434d-442d has edges to at least three of the vertices 444k-452k. The edge connectivity of the graph 400c is three (3), since at least three edges would have to be deleted to disconnect the graph 400c. In practical terms, this signifies that each of the keys (represented by vertices 444k-452k) is associated with at least three of the domains (represented by vertices 434d-442d) and that each domain is associated with at least three of the keys. The strength of the relationship between the domains is, therefore, stronger than the relationships illustrated in FIGS. 4A and 4B. As a result, a label calculator would use graph 400c to predict a maliciousness value if the graph robustness threshold was set to an edge connectivity of 3 or less.

Figure 4D:
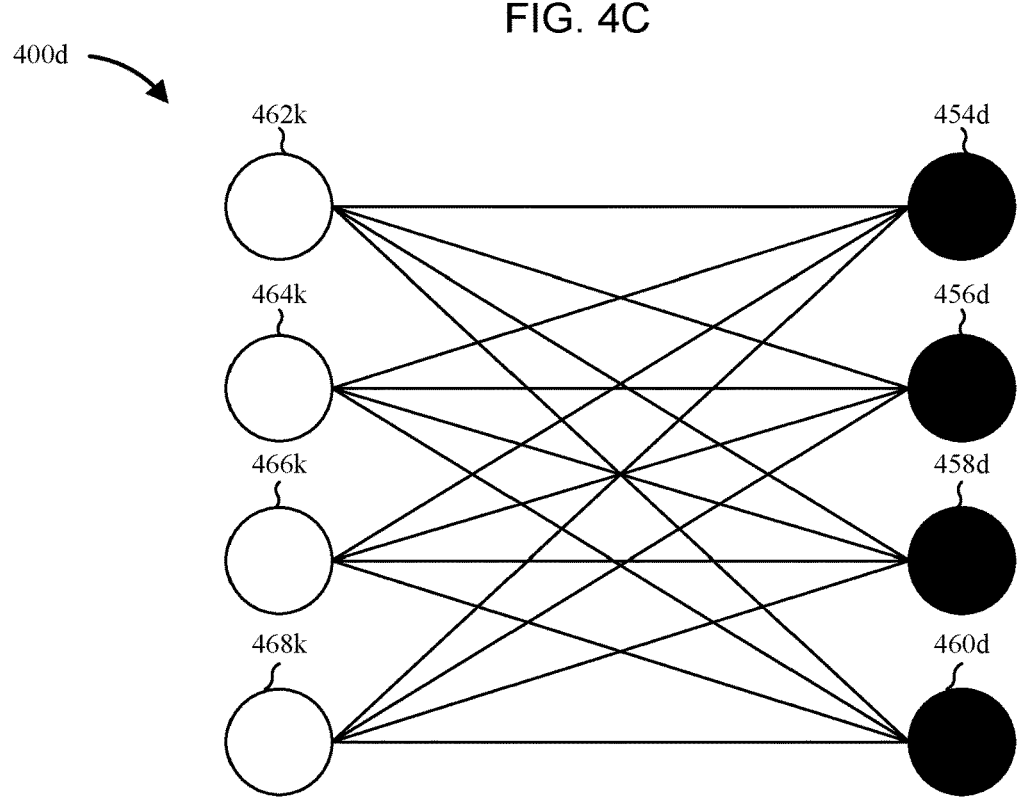
FIG. 4D illustrates a graph representing a fourth example relationship between domains and keys, according to one embodiment.

FIG. 4D illustrates a graph 400d that represents a fourth example relationship between domains and keys, according to one embodiment. Vertices 454d-460d represent network domains. Vertices 462k-468k represent keys associated with the network domains in a domain registration database, such as registrant email addresses, street addresses, registrant names, or registrant organizations. As shown, each of the vertices 454d-460d has edges to at least three of the vertices 462k-468k. The edge connectivity of the graph 400d is four (4), since at least four edges would have to be deleted to disconnect the graph 400d. In practical terms, this signifies that each of the keys (represented by vertices 462k-468k) is associated with at least three of the domains (represented by vertices 454d-460d) and that each domain is associated with at least four of the keys. The strength of the relationship between the domains is, therefore, stronger than the relationships illustrated in FIGS. 4A, 4B, and 4C. As a result, a label calculator would use graph 400d to predict a maliciousness value if the graph robustness threshold was set to an edge connectivity of 4 or less.

Figure 5:
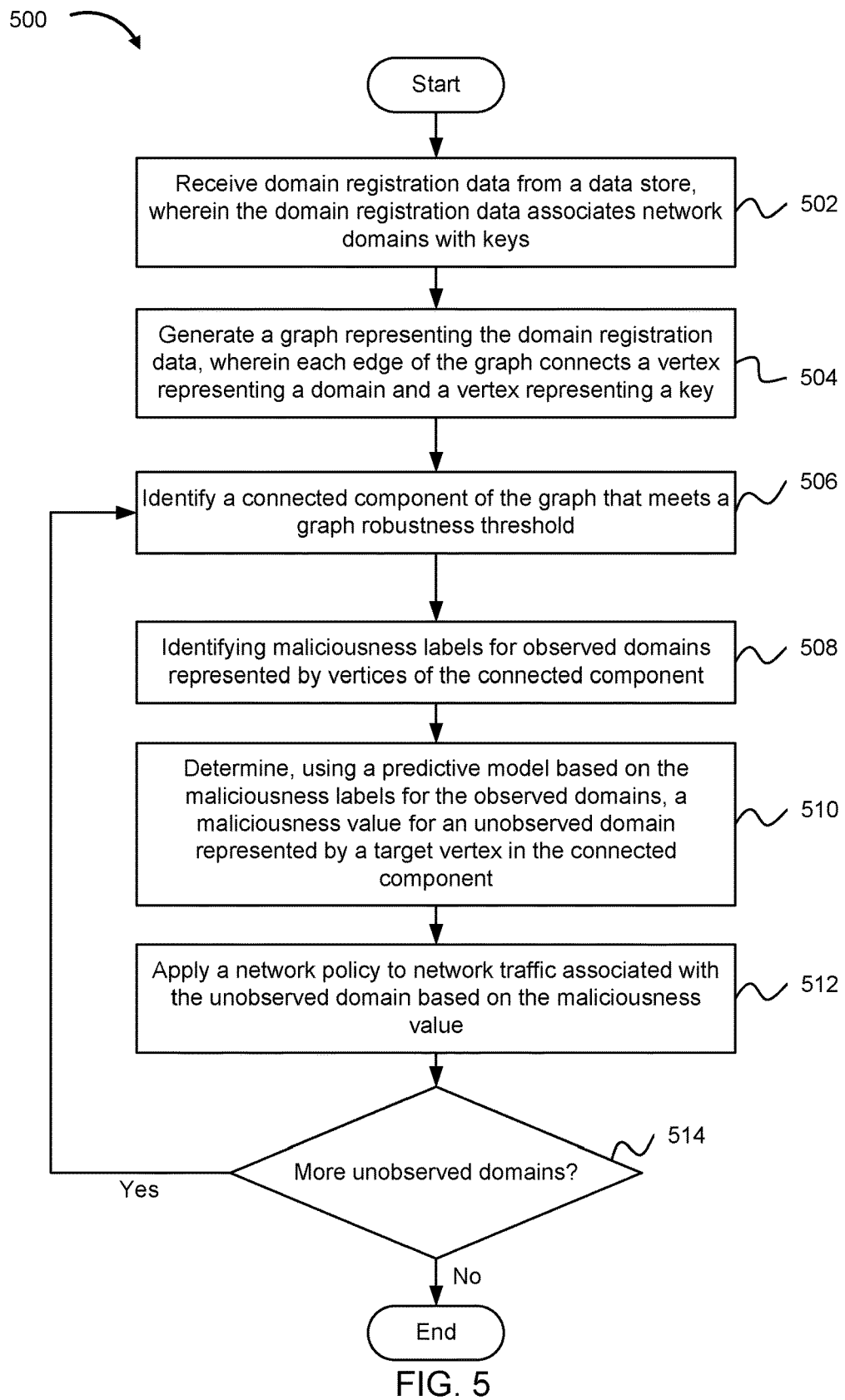
FIG. 5 illustrates a method for detecting malicious network domains, according to one embodiment.

FIG. 5 illustrates a method 500 for detecting malicious network domains, according to one embodiment. At step 502, a router (or another network security device) receives domain registration data from a data store. The domain registration data associates network domains with keys (e.g., registrant email addresses, street addresses, registrant names, or registrant organizations).

At step 504, a graph generator creates a graph representing the domain registration data. Each edge of the graph connects a vertex representing a domain and a vertex representing a key. At step 506, a robustness calculator identifies a connected component of the graph that meets a graph robustness threshold. The graph robustness threshold may be a measure of edge connectivity or of some other graph robustness metric, such as vertex connectivity, maximum distance, number of spanning trees, or effective resistance.

At step 508, a label calculator identifies maliciousness labels for observed domains represented by vertices of the connected component. The maliciousness values may be quantitative (e.g., probabilities or numerical scores), categorical (e.g., "safe," "questionable," or "malicious"), or binary (e.g., "0" for benign and "1" for malicious). In one embodiment, the label calculator determines a probability that the unobserved domain is malicious, compares the probability to a threshold probability; and assigns the maliciousness value to the unobserved domain based on the comparison.

At step 510, the label calculator determines, using a predictive model based on the maliciousness labels for the observed domains, a maliciousness value for an unobserved domain represented by a target vertex in the connected component.

At step 512, the router applies a network policy to network traffic associated with the unobserved domain based on the maliciousness value. For example, if the unobserved domain has a maliciousness value that meets a threshold, the router can block traffic destined for, or sent from, the unobserved domain.

At step 514, the router determines whether there are any additional unobserved domains for which maliciousness values have not yet been determined. If there are, and those additional domains are included in connected components that meet the graph robustness threshold, steps 506-512 are repeated. Otherwise, the method 500 terminates.

Figure 6:
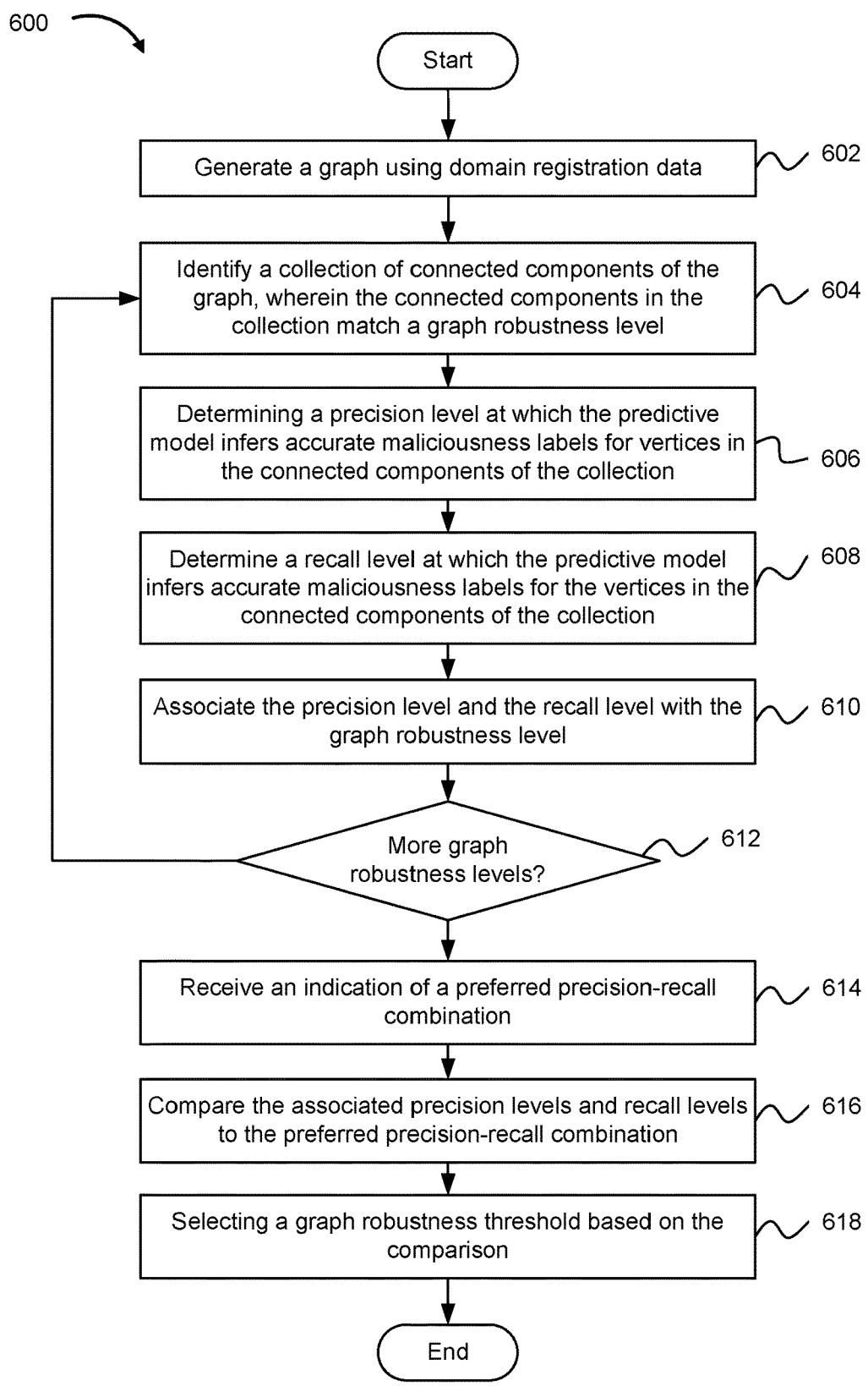
FIG. 6 illustrates a method for selecting a graph robustness threshold for detecting malicious network domains, according to one embodiment.

FIG. 6 illustrates a method 600 for selecting a graph robustness threshold for detecting malicious network domains, according to one embodiment. At step 602, a graph generator (e.g., at a router) creates a graph using domain registration data. The graph is created in the same manner as the graph described in FIG. 5. In other words, each edge of the training graph connects a vertex representing a domain to a vertex representing a key. In the method 600, the domain registration data describes relationships between observed domains and keys. Since the domains are observed, maliciousness values assigned by a predictive model can be checked for accuracy.

At step 604, a robustness calculator identifies a collection of connected components of the graph. The connected components in the collection match a graph robustness level. In one embodiment, the graph robustness level is a measure of edge connectivity. For example, if the graph robustness level is an edge connectivity of 1, each connected component in the collection is has an edge connectivity of exactly 1.

At step 606, a precision level at which the predictive model infers accurate maliciousness labels for vertices in the connected components of the collection is determined. In this context, the term "precision" refers to the fraction of domains tagged as malicious that are actually malicious. At step 608, a recall level at which the predictive model infers accurate maliciousness labels for the vertices in the connected components of the collection is determined. In this context, the term "recall" refers to the ratio of the correctly labeled malicious domains to the sum of the correctly labeled malicious domains and the incorrectly labeled malicious domains (which are actually benign domains).

In order to determine the precision level and the recall level, the predictive model determines maliciousness values for the domains represented by vertices in the connected components of the collection. For example, when determining a maliciousness value for a given domain, the predictive model can treat the domain as unobserved and use the maliciousness labels from the other domains represented by vertices of the connected component to infer the maliciousness value. The maliciousness value for the domain can then be compared to the maliciousness label for the domain (which is known, since the domain is actually an observed domain).

At step 610, the precision level and the recall level are associated with the graph robustness level used in step 604. In this manner, the precision level and the recall level that the predictive model achieves at a given graph robustness level are saved for later reference.

At step 612, the router determines whether there are any additional graph robustness levels for which precision and recall levels are to be calculated. For example, if the graph robustness level is a measure of edge connectivity, it may be useful to calculate precision and recall levels for edge connectivity levels of 1, 2, 3, and 4. More generally, suppose if two domains can have up to j keys in common in the graph, steps 604-610 can be repeated for all edge connectivity levels ranging from 1 to j. For example, if the graph includes key vertices for registrant email addresses, registrant street addresses, registrant names, and registrant organizations, two domains can have up to four keys in common and steps 604-610 are repeated for edge connectivity levels of 1, 2, 3, 4. Once the precision and recall levels have been calculated for each graph robustness level (e.g., edge connectivity level), the router proceeds to step 614.

At step 614, the router receives an indication of a preferred precision level or a preferred recall level (or both). The indication may be received, for example, from an administrator who has permission to adjust security settings via a computing device in communication with the router.

At step 616, the router compares the preferred precision level or preferred recall level to the precision levels or recall levels associated with the graph robustness levels (e.g., in step 610), respectively. At step 618, the router selects a graph robustness threshold based on the comparison. Specifically, the router can select the lowest graph robustness threshold that is associated with a precision level (or recall level) that meets or exceeds the preferred precision level (or recall level). If both a preferred precision level and a preferred recall level are received, the router can select the lowest graph robustness threshold that meets both the preferred precision level and the preferred recall level.

Figure 7:
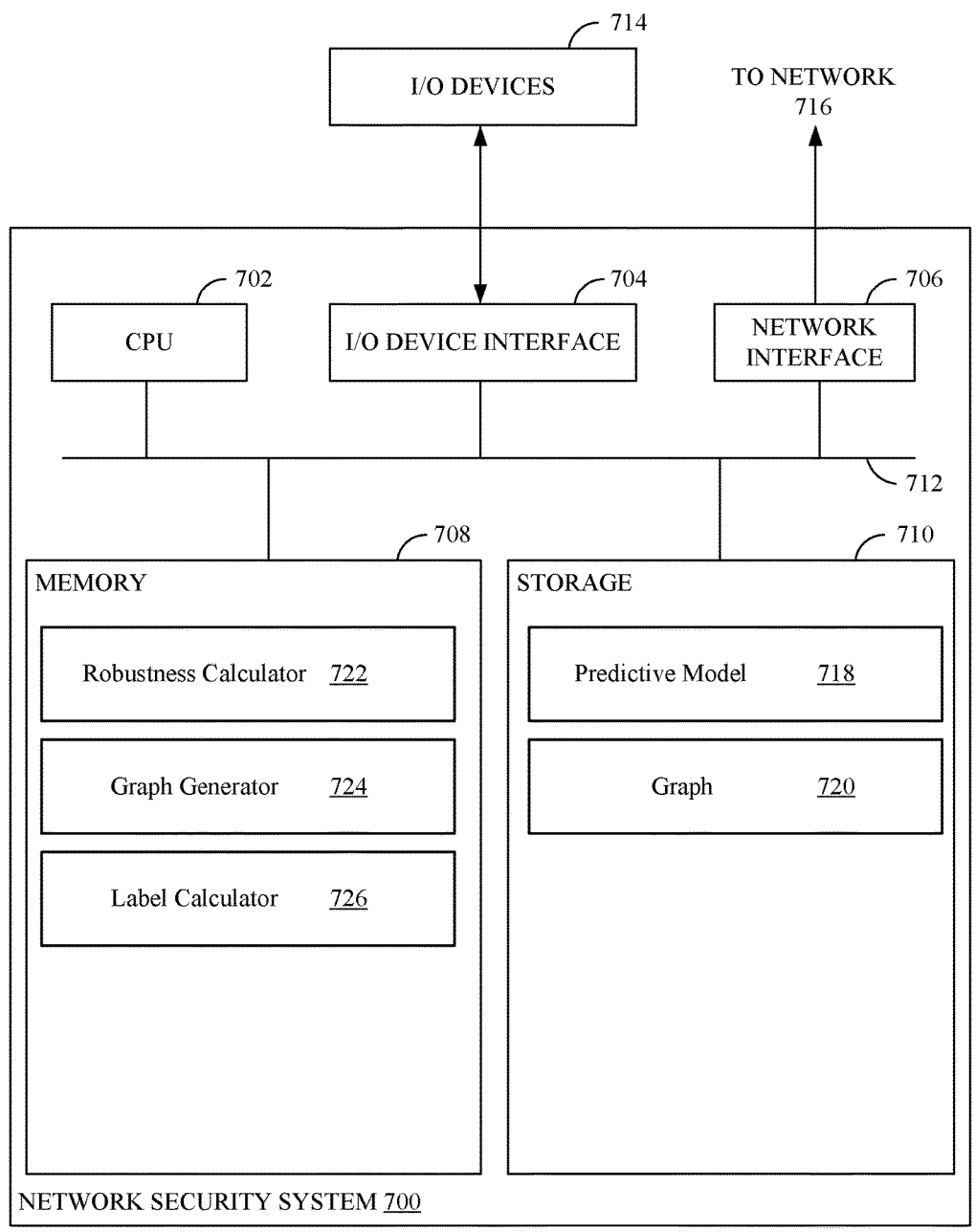
FIG. 7 illustrates an example network security system that detects malicious network domains, according to an embodiment.

FIG. 7 illustrates an example network security system 700 that detects malicious network domains, according to an embodiment. As shown, network security system 700 includes, without limitation, a central processing unit (CPU) 702, one or more I/O device interfaces 704 which may allow for the connection of various I/O devices 714 (e.g., keyboards, displays, mouse devices, pen input, etc.) to the network security system 700, network interface 706 which may allow connection to network 716, a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, memory 708, and storage 710. CPU 702 can represent a single CPU, multiple CPUs, a single CPU having multiple processing cores, and the like. Additionally, the memory 708 represents random access memory. Furthermore, the storage 710 may be a disk drive. Although shown as a single unit, the storage 710 may be a combination of fixed and/or removable storage devices, such as fixed disc drives, removable memory cards or optical storage, network attached storage (NAS), or a storage area-network (SAN).

As shown, memory 708 includes robustness calculator 722, graph generator 724, and label calculator 726. As shown, storage 710 includes predictive model 718 and graph 720. Graph generator 714 creates the graph 720 using domain registration information. Robustness calculator 722 identifies connected components of the graph 720 that meet a graph robustness threshold. Label calculator 726 identifies maliciousness labels for observed domains represented by vertices in the connected components of the graph 720. Label calculator 726 then uses predictive model 718 to determine maliciousness values for unobserved domains represented by vertices in the connected components of the graph 720.

While the foregoing is directed to embodiments of the present disclosure, other and further embodiments of the disclosure may be devised without departing from the basic scope thereof. For example, aspects of the present disclosure may be implemented in hardware, software, or a combination of hardware and software. One embodiment of the disclosure may be implemented as a program product for use with a computer system. The program(s) of the program product define functions of the embodiments (including the methods described herein) and can be contained on a variety of computer-readable storage media. Illustrative non-transitory computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., a hard-disk drive or any type of solid-state random-access semiconductor memory) on which alterable information is stored. Such computer-readable storage media, when carrying computer-readable instructions that direct the functions of the present disclosure, are embodiments of the present disclosure.

Although certain embodiments may achieve advantages over other possible solutions and/or over the prior art, whether a particular advantage is achieved by a given embodiment is not limiting. Thus, the following aspects, features, embodiments and advantages are merely illustrative and are not considered elements or limitations of the appended claims except where explicitly recited in a claim(s).

Aspects of the present disclosure may be embodied as a system, method or computer program product. Accordingly, embodiments presented herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible or otherwise non-transitory medium that can contain, or store a program for use by or in connection with an instruction execution system, apparatus or device.

The flowchart and block diagrams in the Figures illustrate the architecture, functionality, and operation of possible implementations of systems, methods, and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet.

In view of the foregoing, the scope of the present disclosure is determined by the claims that follow.

We claim:

1. A method to improve security in a computer network comprising:

identifying a first network domain registered in a domain registration data store, wherein each network domain registered in the domain registration data store is associated with a set of registration attributes and wherein the first network domain does not have an observed network traffic history;

generating a graph representing a set of domains from the domain registration data store, wherein each edge of the graph connects a vertex representing one of the registered network domains to a vertex representing one of the registration attributes;

identifying a connected component of the graph that meets a robustness threshold, wherein the connected component includes at least a target vertex representing the first network domain and vertices selected from the set of network domains represented in the graph, wherein each selected vertex represents a registered network domain with a known network traffic history;
determining, using a predictive model generated based on behavior of each network domain with known network traffic history, a maliciousness value representing a probability that the first network domain is an expected source of malicious network traffic; and
blocking network traffic associated with the first network domain according to a network policy.

2. The method of claim 1, wherein the predictive model is a Variational Bayes model.

3. The method of claim 1, wherein the robustness threshold is a measure of edge connectivity.

4. The method of claim 1, wherein the registration attribute is a registrant email address, a street address, a registrant name, or a registrant organization.

5. The method of claim 1, further comprising:
identifying a collection of connected components of the graph, wherein the connected components in the collection match the robustness threshold;
determining a precision level at which the predictive model infers that a subset of network domains represented by selected vertices in the connected components of the collection are malicious;
determining a recall level at which the predictive model infers that the subset of network domains represented by the selected vertices in the connected components of the collection are malicious; and
associating the precision level and the recall level with the robustness threshold.

6. The method of claim 5, further comprising:
receiving an indication of a preferred precision level;
comparing the precision level to the preferred precision level; and
determining the robustness threshold based on the comparison.

7. The method of claim 5, further comprising:
receiving an indication of a preferred recall level;
comparing the recall level to the preferred recall level; and
determining the robustness threshold based on the comparison.

8. A system to improve security in a computer network comprising:
a processor; and
a memory storing one or more applications that, when executed on the processor, perform an operation, the operation comprising:
identifying a first network domain registered in a domain registration data store, wherein each network domain registered in the domain registration data store is associated with a set of registration attributes and wherein the first network domain does not have an observed network traffic history;
generating a graph representing a set of domains from the domain registration data store, wherein each edge of the graph connects a vertex representing one of the registered network domains to a vertex representing one of the registration attributes;
identifying a connected component of the graph that meets a robustness threshold, wherein the connected component includes at least a target vertex representing the first network domain and vertices selected from the set of network domains represented in the graph, wherein each selected vertex represents a registered network domain with a known network traffic history;
determining, using a predictive model generated based on behavior of each network domain with known network traffic history, a maliciousness value representing a probability that the first network domain is an expected source of malicious network traffic; and
blocking network traffic associated with the first network domain according to a network policy.

9. The system of claim 8, wherein the predictive model is a Variational Bayes model.

10. The system of claim 8, wherein the robustness threshold is a measure of edge connectivity.

11. The system of claim 8, wherein the registration attribute is a registrant email address, a street address, a registrant name, or a registrant organization.

12. The system of claim 8, wherein the operation further comprises:
identifying a collection of connected components of the graph, wherein the connected components in the collection match the robustness threshold;
determining a precision level at which the predictive model infers that a subset of network domains represented by selected vertices in the connected components of the collection are malicious;
determining a recall level at which the predictive model infers that the subset of network domains represented by the selected vertices in the connected components of the collection are malicious; and
associating the precision level and the recall level with the robustness threshold.

13. The system of claim 12, wherein the operation further comprises:
receiving an indication of a preferred precision level;
comparing the precision level to the preferred precision level; and
determining the robustness threshold based on the comparison.

14. The system of claim 12, wherein the operation further comprises:
receiving an indication of a preferred recall level;
comparing the recall level to the preferred recall level; and
determining the robustness threshold based on the comparison.

15. A non-transitory computer readable storage media encoded with software to improve security in a computer network comprising computer executable instructions and when the software is executed is operable to:
identify a first network domain registered in a domain registration data store, wherein each network domain registered in the domain registration data store is associated with a set of registration attributes and wherein the first network domain does not have an observed network traffic history;
generate a graph representing a set of domains from the domain registration data store, wherein each edge of the graph connects a vertex representing one of the registered network domains to a vertex representing one of the registration attributes;
identify a connected component of the graph that meets a robustness threshold, wherein the connected component includes at least a target vertex representing the first network domain and vertices selected from the set of network domains represented in the graph, wherein each selected vertex represents a registered network domain with a known network traffic history;

determine, using a predictive model generated based on behavior of each network domain with known network traffic history, a maliciousness value representing a probability that the first network domain is an expected source of malicious network traffic; and block network traffic associated with the first network domain according to a network policy.

16. The non-transitory computer readable storage media of claim 15, wherein the robustness threshold is a measure of edge connectivity.

17. The non-transitory computer readable storage media of claim 15, wherein the registration attribute is a registrant email address, a street address, a registrant name, or a registrant organization.

18. The non-transitory computer readable storage media of claim 15, wherein the software, when executed, is further operable to:

identify a collection of connected components of the graph, wherein the connected components in the collection match the robustness threshold;

determine a precision level at which the predictive model infers that a subset of network domains represented by selected vertices in the connected components of the collection are malicious;

determine a recall level at which the predictive model infers that the subset of network domains represented by the selected vertices in the connected components of the collection are malicious; and associate the precision level and the recall level with the robustness threshold.

19. The non-transitory computer readable storage media of claim 18, wherein the software, when executed, is further operable to:

receive an indication of a preferred precision level;

compare the precision level to the preferred precision level; and determine the robustness threshold based on the comparison.

20. The non-transitory computer readable storage media of claim 18, wherein the software, when executed, is further operable to:

receive an indication of a preferred recall level;

compare the recall level to the preferred recall level; and determine the robustness threshold based on the comparison.

* * * * *